United States Patent Office 3,849,516
Patented Nov. 19, 1974

3,849,516
GRAFTED POLYOLEFINS AS STABILIZER COMPONENTS IN POLYOLEFINS
Don A. Plank, Baytown, Tex., assignor to Exxon Research and Engineering Company
Filed Apr. 3, 1972, Ser. No. 240,738
Int. Cl. C08f 29/12
U.S. Cl. 260—876 R                    12 Claims

ABSTRACT OF THE DISCLOSURE

Polyolefin compositions having improved resistance to oxidation are obtained by including within a polyolefin composition a small quantity of a polar-grafted polyolefin, particularly acrylic acid grafted polypropylene materials.

BACKGROUND OF THE INVENTION

Figure 1:
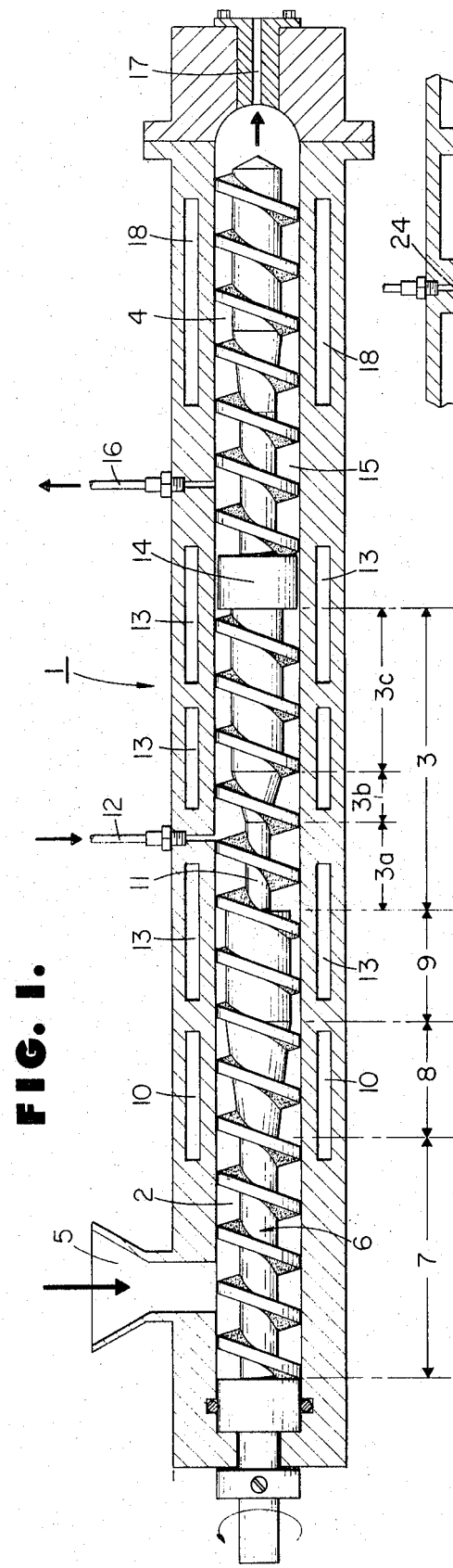

Many polymers are susceptible to oxidative and photo-initiated degradation and conventionally this is retarded by utilizing additives which are termed antioxidants and UV stabilizers respectively. Polymers made from olefins are especially susceptible to oxidative degradation.

Low density polyethylene usually requires only a small amount of antioxidant and polystyrene likewise requires only a minimal amount of antioxidants. Nevertheless, high density polyethylene, high impact polystyrene, ABS terpolymers and polypropylene are included among commerical polymers which are exceedingly sensitive to oxidative degradation both while being processed and upon exposure to the environment.

It is generally accepted that polymer degradation by free radicals in the presence of oxygen involves chain scission followed by termination. Chain scission results in loss of molecular weight, increased melt flow, a decrease of polymeric toughness some cross-linking and an eventual disintegration to powder.

Cross-linking results in an increase of molecular weight, embrittlement and a decrease in melt flow.

It is apparent that many polymers will have to be exposed to heat, both during processing and during their life in a particular use, and oxygen will also be unavoidable in these applications. Therefore, the adverse effect of degradation must be minimized in order to obtain a reasonable service life for the polymer material.

A great many compounds for stabilizing polyolefins have been developed with the object of retarding, inhibiting or otherwise modifying the degradation process. People disagree as to exactly how these stabilizers function.

There is general agreement that one class of materials prevents adverse degradation by oxidation by acting by a free radical scavenging mechanism. Examples of these are hindered phenols and amines.

Another type acts as peroxide decomposers which actually decompose the peroxides formed on the polymer backbone. Classes of compounds which appear to work in this manner are thioesters and phosphites.

Thioesters and alkyl aryl phosphates are generally used in combination with the hindered phenols and appear to interact with them to increase the overall stability in a synergistic manner although their primary function is apparently as peroxide decomposers.

Even though additives can be obtained which in their theoretical mechanism would appear to give satisfactory service, a great many other practical environmental factors are relevant and must be satisfied before a given additive or additive system can be acceptable for commercial use.

The most important of these criteria are: the solubility and compatibility of the additive in the base polymer, i.e. the additive should not be rejected by the polymer matrix. The additive should not migrate easily to the surface of the polymer and thus be extracted by environmental forces.

The additive should be capable of withstanding extraction by environmental factors such as water, i.e. if it were to be used in a pump or a washing machine.

The additives should not evaporate from the polymer matrix when molding or extruding at relatively high temperatures.

Also, additives might be selected with the requirement in mind in that they must comply with FDA regulations under some conditions. Furthermore, additives, particularly antioxidants can react with each other and with other components of the polymer system to form colored compounds or complexes which undesirably color the polymer.

Thus it is seen that the use of antioxidants, although conventional is complex, sophisticated and requires that a great many boundary criteria be met.

Many polymers including polyolefins, polyesters, polystyrenes, ABS acrylics, polycarbonates and other thermoplastics experience attack from ultraviolet radiation. This occurs primarily with outdoor exposure where visible light from the 290-400 m. micron range is strong enough to break chemical bonds in such polymers.

Polypropylene, for instance, is exceptionally sensitive to ultraviolet radiation. This type of attack is accelerated by concomitant oxidative degradation. Thus, polymers of this type in outdoor use will always have a stabilizer system which contains a UV stabilizer and an oxidative stabilizer.

Generally the mechanism of oxidative degradation gives rise to carbonyl groups on the polymer chain which results in the chain scission radical formation. Carbonyl groups are susceptible to UV radiation which causes chain scission and which leads to reduced molecular weights.

A conventional method of retarding adverse effects of UV radiation is to incorporate in the polymer compounds that will absorb irradiation and convert it into a harmless form. Such compounds have high absorption coefficients in the UV portion of the spectrum but minimal absorption in the visible range so that no color is imparted to the polymer. Typical UV absorbers are benzophenones, benzotriazoles and acrylonitriles.

Another technique for deactivating the adverse effects of UV radiation involves quenching or deactivating the carbonyl groups on the polymer chain which have been activated by the UV radiation. These are quenched primarily by nickel complexes and the process involves the transfer of energy, which is not destructive to the polymer.

Nickel complexes of various compounds such as thiobisphenols, nickel carboxylates, nickel amines all have activity as UV stabilizers. Carbon black is also a UV absorber and can be used in polyolefins. Nickel complexes impart some yellow discoloration to polyolefins. This can become intensified in the presence of other materials such as other UV absorbers or stabilizers and antioxidants. Thus care must be taken in the choice of all the components in the additive system to minimize the adverse side effects. UV stabilizers as is true for oxidative stabilizers should also be resistant to physical leaching, volatilization and heat degradation.

SUMMARY OF THE INVENTION

Novel polyolefin compositions containing $C_2$ to $C_{10}$ olefin constituents, which are conventionally stabilized against high temperature heat aging, i.e. oxidative degradation and/or UV, i.e. ultraviolet degradation, with conventional additives, are considerably improved in heat stability using lesser quantities of conventional additive by utilizing small quantities of an additive of the invention which is a $C_2$ to $C_{10}$ polyolefin, which has been grafted with small amounts of unsaturated carboxylic acids and/or their derivatives, preferably monocarboxylic acids and most preferably acrylic acid.

RELATED APPLICATIONS

This application utilizes processes and products which have been described in several other copending, commonly assigned applications, i.e. Ser. Nos. 240,463; 240,494; 240,468; 240,496; 240,502; all filed Apr. 3, 1972 however, it is not formally related to any of them.

PREFERRED EMBODIMENTS OF THE INVENTION

It has now been discovered and forms a unique feature of this invention that novel, unobvious, stabilized polymer compositions can be prepared by including in either a UV stabilized system or an oxidative stabilized polymer system, or both, particularly in a polyolefin system a small additive quantity of a polar grafted polyolefin, particularly an acrylic acid grafted polypropylene. The grafted polymer additives of the invention impart outstanding oxidative stability to the base polymer. They perform two distinct and important functions, depending on the particular stabilization system of the base polymer.

When the polymer is stabilized with either a nickel complex or a benzophenone type ultraviolet absorber, it has been long observed by the art that these additives while effective for ultraviolet degradation purposes tend to increase the oxidative susceptibility of the polymer.

The additives of the invention tend to neutralize the adverse effect of the ultraviolet stabilizer additives, while still substantially retaining the ability of the compound to resist ultraviolet degradation.

Furthermore, the additive stabilizers of the invention will interact synergistically with conventional antioxidants so that amount of conventional antioxidant required to achieve a given oxidative level is substantially decreased. Since the graft polymer antioxidant additives of the invention are substantially less expensive than conventional antioxidant molecules which tend to be exotic and quite expensive, substantial and important savings are achieved with no loss in the overall stability of the polymer and indeed the polymer is sometimes enhanced in its overall properties with this approach.

DESCRIPTION OF THE GRAFT POLYMER

For the compositions of the invention it is possible to use graft polymers prepared by known methods in the art, e.g. those to be found in U.S. Pats. 3,177,269; 3,177,270; U.S. 3,270,090; British 1,217,231; British 679,562 and the like.

The preferred modifying monomers which are grafted to the backbone are $C_3$ to $C_{10}$ unsaturated mono- and polycarboxylic-containing unsaturated acids with preferably at least one olefinic unsaturation, and hydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citronic acid, acrylic acid, glycidyl acrylate, $C_1$ to $C_{20}$ alkyl cyanoacrylate, hydroxy alkyl methacrylate, acrylic polyethers, acrylic anhydride, methacrylic acid, crotonic acid, isocrotonic acid, mesaconic acid, angelic acid, maleic anhydride, itaconic anhydride, citratronic anhydride, acrylonitrile, and methacrylonitrile.

Other monomers which can be used either by themselves or in combination with one or more of the carboxic acids or derivatives thereof include $C_{10}$ to $C_{50}$ vinyl monomers such as monovinyl aromatic compounds, i.e. styrene, chlorostyrenes, bromostyrenes, α-methyl styrene and the like.

Other monomers which can be used are $C_5$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethacrylate, triallyl phosphite, dialkylcyanurate and triallyl cyanurate.

Nevertheless the most outstanding results and the highly preferred embodiments of this invention are those in which the graft copolymer meets some highly specific criteria. Primary is the concept that the graft copolymer not only contain grafted active functionality but that the backbone polymer itself be reduced considerably in melt flow so that it is more compatible with other components of the total composition and also exerts a much more powerful synergistic influence on the overall composition.

Characteristics of the Preferred Polymer to be Used in the Inventive Compositions The graft polymer of the invention can be characterized in several respects. These are:

1. A melt index or MFR of from 1 to 500, preferably 10 to 250, most preferably 10 to 100 and most preferably at least 25% or more, usually 50% or more, especially 300% or more higher than the melt index or MFR of a starting polymer having a melt index or MFR of from no-flow to 50 as measured under conditions of A.S.T.M. test No. D-1238-65T.

2. A graft comonomer content of from 0.02 to 20, preferably 0.1 to 10 and most preferably 0.2 to 8, based on the total weight of the graft copolymer.

3. For polymers containing $C_3$ to $C_8$ olefins, a die swell at least .05 of a unit less than that of the base polymer, preferably at least 1.0.

In an especially preferred embodiment, the stabilizer additives of the present invention are prepared by grafting a polymer of a $C_2$ to $C_8$ mono-α-olefin or its copolymers with acrylic acid. The polymers of $C_2$ to $C_8$ mono-α-olefins are commonly referred to as polyolefins and for the purpose of this invention are to include copolymers of the $C_2$ to $C_8$ mono-α-olefins with each other and with other monomers as well as the homopolymers.

Polymers containing diolefins such as butadiene and isoprene are also suitable. The polyolefins are produced utilizing in most instances a Ziegler-type catalyst, but can also be Phillips catalysts and high pressure technology. The processes for making the $C_2$ to $C_8$ olefins are well known and form no part of the present invention.

Examples of suitable polyolefins, both plastic and elastomeric, include low or high density polyethylene, polypropylene, polybutene-1, poly-3-methyl-butene-1, poly-4-methylpentene-1, copolymers of monoolefins with other olefins (mono or diolefins) or vinyl monomers such as ethylene-propylene copolymer or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The polymer used as a base material in the present invention will preferably have a melt index or melt flow rate (MFR) between about 0.1 and 20 and, preferably, 0.2 and 5.0, most preferably 0.5 to 2. These melt flow rates correspond approximately to viscosity average molecular weights of between 700,000 and 200,000.

In the preparation of normally solid polymers of 1-olefins, certain rheological properties are frequently utilized for control purposes. One of these rheological properties more usually employed is melt index or melt flow rate which characterizes the processability of the polymers and is also an indication of polymer molecular weight.

The melt index of polyethylene is measured normally according to the A.S.T.M. test D-1238-57T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing 2160 grams.

The melt flow rate (MFR) of polypropylene is determined by the same procedure except at a temperature of 230° C. according to A.S.T.M. D–1238–57T condition L (from 1962 A.S.T.M. preprint). The apparatus utilized for determining melt index is defined in A.S.T.M. manual as a "dead-weight piston plastometer."

The preferred monomers to be grafted to the $C_2$ to $C_8$ polyolefin and other polymers according to the present invention are maleic anhydride, acrylic acid, methacrylic acid, glycidyl acrylate, hydroxy methacrylate, hydroxy methylmethacrylate and their derivatives. Others that can be used are described elsewhere. However, other monomers may be added in admixture with these such as maleic anhydride, styrene acid esters, salts and the like to form graft copolymers.

The preferred grafting reaction is initiated by a free-radical initiator which is preferably an organic peroxygen compound. Especially preferred peroxides are t-butyl benzoate, dicumyl peroxide, 2,5-dimethyl-2,5- di-*tert*-butylperoxy-3-hexyne (Lupersol 130), $\alpha,\alpha'$-bis(*tert*-butylperoxy) diisopropyl benzene (VulCup R), or any free radical initiator having a 10-hour half-life temperature over 80° C. or mixtures thereof. Generally, the higher the decomposition temperature of the peroxygen compound, the better. See pp. 66–67 of *Modern Plastics*, Nov. 1971, which is incorporated hereby by reference for a more complete list of such compounds.

An Illustrative Embodiment of a Preferred Process for Preparing the Grafts of the Invention Referring to FIG. 1, an extruder 1 having a feed zone 2, a reaction zone 3, and a metering zone 4 is utilized to carry out one embodiment of a grafting process useful for making grafts to be used in the present invention.

Polypropylene is introduced into a hopper 5 in the feed zone 2 of the extruder 1. The extruder screw 6 in the feed zone 2 can be various conventional designs such as a feed portion 7, a transition portion 8 and a first stage metering portion 9.

In the feed zone 2, the polypropylene is heated by heaters 10 to a barrel temperature in the range of 400° to 650° F., preferably 400° to 550° F. In processes utilizing $O_2$ as an initiator, much higher temperatures, i.e. about 675 to 800° F. are required and control is more difficult.

Extruder screw 6 has a root (sometimes called core) starting at the initial boundary of reaction zone 3 with a reduced cross-sectional area 11. This provides additional volume for reaction zone 3. When polymer under pressure reaches zone 3, the increased available volume results in a pressure drop, i.e. decompression, so that particular mass of polymer is not subjected to the ordinary high pressures in the extruder.

An injection line 12 connects reaction zone 3 to a source of initiator, preferably a peroxide. For the purposes of this specific embodiment, the monomer is acrylic acid and the initiator is VulCup R.

Injection of initiator at this point where low pressures in zone 3 prevail provides thorough mixing of the initiator and polypropylene in an extremely short period of time and appreciable degradation of the polypropylene. Appropriate controls of the polyproylene feed rate and screw speeds are maintained.

In this particularly preferred embodiment, the initiator and acrylic acid are added as a liquid blend to zone 3. When only degradation is desired, initiator alone or with solvent is introduced into zone 3.

It has been found that appreciable degradation of the polypropylene occurs when the back pressure against the liquid mixture of initiator and acrylic acid in injection line 12 is less than about 100 p.s.i. Best results are obtained when the back pressure, i.e., the pressure in excess of a fixed pressure at which the initiator and acrylic acid are forced into the extruder 1, is substantially zero.

The pressure in injection line 12, therefore, provides one indicia that the polypropylene feed rate and screw speed are being appropriately controlled for the particular products desired.

The preferred graft copolymers to be used in the present invention have appreciable degradation as compared to the base polymer. This is demonstrated by the fact that the graft copolymers of the preferred process have a lower die swell than the polypropylene base stock used in making the copolymer.

The portion of the extruder heated by heaters 13 will have a temperature of from about 160° to 450° F., preferably 250° to 350 F. The polymer should be in the melt stage during the reaction. The extruder screw 6 in the latter portion of reaction zone 3 can have any desired cross-sectional area desirable to provide for pumping and for ancillary mixing if desired and to allow residual reactants to complete their reaction.

It is to be noted that some homopolymerization of the acrylic acid (or any other monomer) to form polyacrylic acid also occurs. But this usually does not exceed 30% of the total acrylic polymer formed. Preferably, the decompression portion 3a of the screw is immediately followed with a transition zone 3b of gradually increasing screw root cross-sectional area followed by a metering zone 3c of constant cross-sectional screw root area.

Thereafter, extruder screw 6 has a melt seal (also called cap or blister) 14 which prevents the free escape of initiator and acrylic acid from reaction zone 3.

Screw 6 also has a second decompression portion 15 following blister 14.

Vent line 16 (which can be optionally provided with vacuum, if desired) is positioned above decompression portion 15 to remove any gases or vapors.

The graft copolymer and homopolymer blend is then passed through metering zone 4 where it is extruded from a die 17 at the end of extruder 1.

The extruder barrel temperature heated by heaters 18 in metering zone 4 is in the range of 350° to 550° F., preferably 350° to 450° F.

Figure 2:
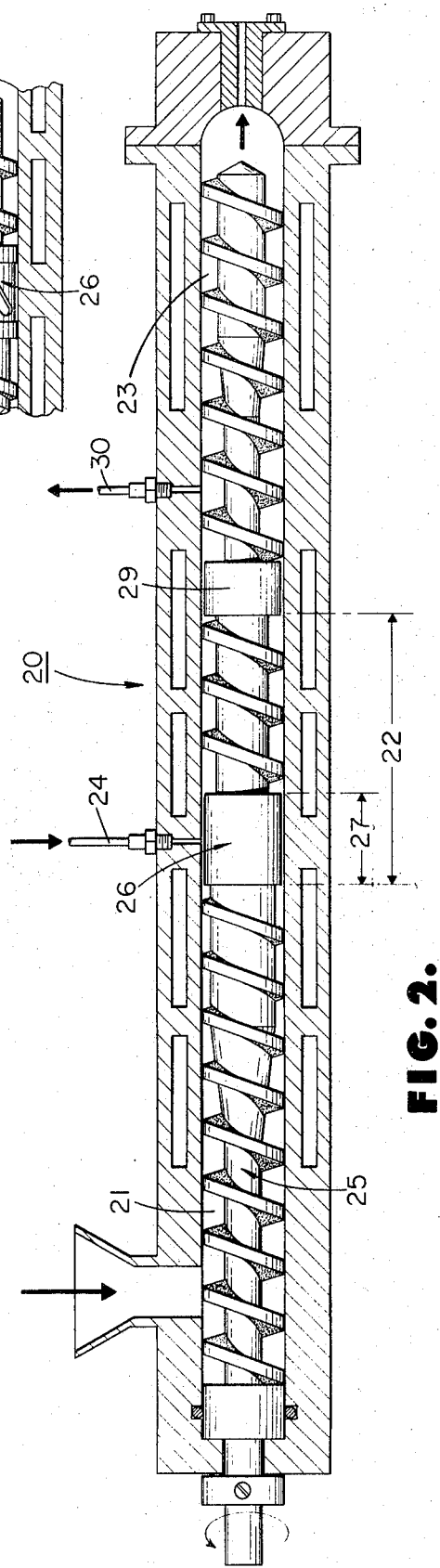

Referring now to FIG. 2, extruder 20, having a feed zone 21, a reaction zone 22 and a metering zone 23, is also utilized to carry out the grafting process of the present invention. The process is generally similar to that described above for FIG. 2, except as follows.

In this embodiment, the initiator and acrylic acid are injected through injection port 24 at a point where the extruder screw 25 has a root of very large cross-sectional diameter, so that the clearance between the root and the interior of extruder 20 is very small and will vary with extruder size. In the preferred 2 inch Egan extruder apparatus of the invention, this clearance is from 5 to 50, preferably 10 to 25, and best 10 to 20 mils. Mixing device 26 is this root.

Figure 3:
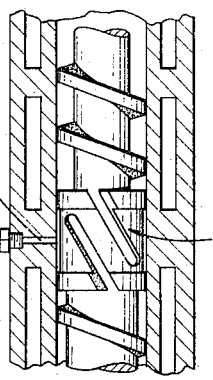

In another preferred embodiment shown in FIG. 3, the mixing device is shown with a series of channels cut in the perimeter of the device. This results in a series of dead end channels. This forces the polymer out of the inlet channels and across the outer surface to the outlet channel.

In any event, whether the embodiments of FIG. 2 or FIG. 3 are used, the polymer outlet velocity is increased and forms a thin fluid film under relatively high shear as compared to the other portions of the extruder.

The initiator and/or acrylic acid are injected at pressures which may range between 1,300 and 5,000 p.s.i. or more specifically, between 1,500 and 3,000 p.s.i. At these high pressures and because only a thin film of polypropylene is present at the high shear-thin film zone 27, intensive, instantaneous mixing with appreciable degradation of the polypropylene occurs.

Extruder 20 is also provided with a blister 29 and a vent 30.

As illustrated by the two embodiments of FIG. 1 and FIG. 2, various extruder designs may be employed to carry out the graft copolymerizing process to obtain the preferred graft polymers of the invention. However, the common characteristic of each extruder design is that thorough instantaneous mixing of the initiator and acrylic acid with the polymer, i.e. polypropylene, occurs. The extremely high degree of mixing which characterizes the process of the present invention is evidenced by appreciable degradation of the polymer. Not only is then a substantial increase in the melt flow rate or melt index of the copolymer over the base resin but the die swell of the graft copolymer is lower than the die swell of the polyolefin base stock used in making the copolymer.

Die Swell

Some high molecular weight polymers such as polyolefins when forced through a capillary die of a relatively short length produce an extrudate of a larger diameter than the diameter of the capillary.

This property of polymers has been characterized as die swell which is expressed numerically as the ratio of the diameter of the extrudate to the diameter of the capillary (by some to the first power and by others to the second power). The term "die swell" as used herein is defined as follows:

$$\text{die swell} = \left(\frac{D_e}{D_o}\right)^2$$

where:

$D_e$ is the extrudate diameter
$D_o$ is the capillary diameter.

The numerical value of die swell is also dependent on the geometry of the rheometer used to force the polymer through the capillary. In obtaining the numerical values set forth herein, and in the tables which follow, a rheometer having a rheometer barrel of $\frac{3}{8}''$ I.D. (inside diameter) was used wherein the barrel was heated to a temperature controlled to $\pm 2°$ F. of the recorded temperature and the polymer was forced through a capillary having a 0.03018" I.D. and which was 1.006" long. The capillary had a 90° entry angle.

The measurements were made by forcing the polymer through the capillary by a plunger operating at a constant speed or a constant shear rate ($\gamma$) ranging from 13.5 reciprocal seconds to 338.3 reciprocal seconds (sec.$^{-1}$). The polymer was forced through the capillary into ambient air at room temperature (70°–80° F.).

The measurement of die swell is frequently used as a gross measure of molecular weight distribution in polyolefins, high die swell resin possess broader molecular weight distribution than polymers having lower die swells.

General Reaction Conditions

The free radical initiator is used in amounts corresponding to 0.005 to 5, preferably 0.02 to 2, most preferably 0.02 to 1.5 weight percent based on polymer. When based on monomer, free radical initiator is used in amounts of 0.0001 to 1, preferably 0.001 to 1, and most preferably 0.001 to 0.5 weight percent.

The monomer to be graft polymerized is used in amounts of 0.1 to 100, preferably 1 to 50, and most preferably 2 to 25 weight percent of the base polymer.

Generally, the monomer and initiator are blended together and added simultaneously, except in the situation of a polyethylene or ethylene predominant copolymer.

In the description of the invention as follows, from time to time certain differences in the applicable process conditions must be employed when the primary characteristics of the polymer are determined as a result of its ethylene content.

It is also to be noted that the stabilizer additives of this invention include elastomers of all classes which are capable of being handled by an extruder. Examples include natural rubber, polyisobutylene, butyl, chlorobutyl, polybutadiene, butadiene - styrene, ethylene - propylene, ethylene-propylene diene terpolymer elastomers and mixtures thereof with each other and with thermoplastic polymers. Blends of elastomers and plastics in any portions particularly benefit from being processed by the preferred process.

Generally speaking, the preferred stabilized blends which have been improved by the invention will contain from about .05 to 1.0, preferably .06 to .6 weight percent of the grafted carboxylic or derivative component, based on the total weight of the final blend.

Thus, assume the preferred polypropylene graft polymer containing 6 weight percent of acrylic acid is utilized. In order to arrive at the proper amount of acrylic graft polymer in the final product, about 1 to 10 weight percent of the grafted polymer will be used. Preferably the grafted polymer of this type is used from about 1 to 5 weight percent and most preferably 1 to 3 weight percent. When the level of acrylic acid is changed in the grafted polymer, appropriate calculations can be made to achieve the requisite grafted component content for the total blend as has been specified above.

Typically on an approximate weight for weight basis conventional antioxidants can be replaced up to 75%, preferably about 50%, with the antioxidant graft polymer of the present invention.

It is important to note that the grafted polymer per se containing, for instance, 6 weight percent of the acrylic acid is not stabilized itself. Furthermore, it is very difficultly stabilizable and essentially the only antioxidant effect which is observed is only seen in combination with stabilizer systems. It is simply not obtained with the fully grafted material. In fact, levels of about 10 weight percent of the grafted material (with 6 weight percent graft) represent the upper limit in which beneficial antioxidant effects are noted. Beyond that the antioxidant effects start becoming detrimental.

Because the grafted antioxidant polymer is essentially similar to the polymer, i.e. polypropylene, to which it is to be added, it can be incorporated quite easily and, of course, is non-extractable, which is a very important characteristic that represents a desideratum for antioxidants.

Moreover, there seems to be some reason to believe that the polarity of the graft tends to exert a stronger attraction on the polar portions of conventional stabilizer and UV additives, thus inclining them to be less migratory, i.e. more resistant to extraction and volatilization.

It is also an important concept relating to the scope of the invention to realize that the grafted additive of the invention works most effectively with the conventional combination of oxidative stabilizers, i.e. a phenolic stabilizer in combination with a thioester.

Furthermore, it has been discovered that the grafted antioxidant exerts no beneficial effect in combination with phenolic antioxidants alone. However, the graft polymer will exhibit some synergistic activity in combination with a thioester antioxidant alone without the phenol.

But the full benefits of the additive of the invention are realized in a complete system of ultraviolet stabilizer, phenolic stabilizer and thioester stabilizer. The UV stabilizers can be either the nickel complex type or the hydroxy benzophenone type or both together. The beneficial effects of the graft additive will be noted in both situations. The invention will be further illustrated by the following examples.

Example 1

An unstabilized commercial polypropylene was dry blended with a conventional antioxidant stabilizer system comprising a hindered phenolic ($A_1$), a thioester ($B_1$), and a phosphite ($C_1$).

The dry blend was extruded in a conventional manner and the resulting blend extruded into 6-mil monofilaments for testing.

In some cases, an acrylic acid grafted polypropylene made according to the description above containing about 9 weight percent of grafted acrylic acid in pellet form was added at the dry blend stage. In some cases, an ultraviolet light stabilizer was added. This stabilizer was also added at the dry blend stage.

The monofilament samples were tested for their thermal stability in a Freas oven at 115.5° C. in order to ascertain the number of days to embrittlement. The results are summarized below in Table I.

TABLE I.—RESULTS OF OVEN AGING

| UV stabilizer | Percent graft | Days to embrittlement |
| --- | --- | --- |
| None | None | 18 |
| Do | 5.0% | 37 |
| 0.5% nickel stearate | None | 11 |
| Do | 5.0% | 37 |

As can be seen above, the acrylic acid grafted polypropylene greatly improved the antioxidant system in and of itself.

When nickel stearate was added, the antioxidant system, by itself, became less effective, but when the acrylic acid graft was added, the total system became as effective as the system with the graft in it without nickel stearate. Thus it is apparent that acrylic acid graft neutralized the generally adverse effect experienced by nickel stearate while retaining its synergistic effect as an antioxidant with the stabilizer system, which it had attained without any nickel stearate present at all.

Of course, the use of grafted acrylic acid is additionally beneficial since it is completely compatible, nonvolatile and nonextractable.

Example 2

This example was performed similarly to that described for Example 1 except that the acrylic acid portion of the grafted polypropylene was 6 weight percent acrylic acid rather than 9 weight percent. Furthermore, the amounts of acid grafts were varied. The amounts of ultraviolet stabilizer and costabilizer used were also varied in order to observe the effects of the graft on two different ultraviolet stabilizers in combination with each other. The results of oven aging in the same test as used for Example 1 are summarized below in Table II.

TABLE II.—RESULTS OF OVEN AGING

| UV stabilizer | Percent graft | Days to embrittlement |
| --- | --- | --- |
| 0.50% nickel stearate | None | 19 |
| Do | 2.5% | 75 |
| 0.50% nickel stearate plus 0.25% UV 531 a | None | 16 |
| 0.25% nickel stearate plus 0.25% UV 531 | 2.5% | 83 | a UV 531—2-hydroxy-4-n-octyloxy benzophenone.

As can be seen from the above Table II, relatively small amounts of the acrylic acid graft result in large improvements in the days to failure. Using a rather high quantity of acrylic acid graft, results in an improvement over the base case but not nearly as much as would be obtained by using lesser quantities. When the supplementary UV stabilizer is utilized in the system without graft, the base case gets worse. But when very small quantities of acrylic acid graft are used with the two ultraviolet stabilizers, the best results of all are obtained.

Thus it is apparent that the interaction of the acrylic acid graft with both the ultraviolet stabilizer and with the conventional oxidative stabilization system results in unusual improvements in oxidative stability.

Example 3

The procedures described in Example 1 were repeated except that a different stabilizer system described below was used. The results observed are summarized below in Table III.

TABLE III

| System | Weight percent | Percent PPAA (6% graft) | | |
| --- | --- | --- | --- | --- |
| | | 0 | 2.0 | 2.5 |
| DSTDP/H'P'/phosphite B | .25/.07/.10 | 12 | | 31 |
| DSTDP/HP/phosphite A | .25/.07/.10 | 32 | | 53 |
| DSTDP/HP/phosphite A | .35/.12/.10 | 50 | | 62 |
| DSTDP/HP/531 | .25/.07/.25 | 11 | | 23 |
| DSTDP/HP/phosphite B/oNi | .25/.07/.1/.25 | 34 | | 38 |
| DSTDP/HP/phosphite B/oNi | .25/.07/.1/.50 | 34 | | 73 |
| DSTDP/HP/phosphite B/oNi | .35/.12/.10/.25 | 52 | | 85 |
| DSTDP/HP/phosphite B/oNi | .35/.12/.10/.50 | 52 | | 85 |
| BHT only | 0.08 | 3 | | 3 |

Key:
 HP=Hindered phenol.
 H'P'=Another hindered phenol.
 BHT=Butylated hydroxy toluene.
 531=2 hydroxy-4-n-octyloxy benzophenone.
 oNi=organic nickel compound.
 DSTDP=Distearyl thiodipropionate.

As can be seen from the data in the above Table III, improvements in oxidative stability are obtained when using the additive of the invention in combination with conventional antioxidant systems and with a UV stabilizer (organic nickel compound) or used with a conventional antioxidant system (including a conventional UV stabilizer) in the absence of an organic nickel compound.

Example 4

The procedures of the above examples were repeated except that different stabilizer systems were used and Freas Oven data obtained according to the A.S.T.M. D3012 Test Method where 50 ml. plaques are molded from the samples. The results are summarized below in Table IV.

TABLE IV

| System | Weight percent | Percent PPAA (6% graft) | | | | | |
| --- | --- | --- | --- | --- | --- | --- | --- |
| | | 160° C. | | | 150° C. | | |
| | | 0 | 2.5 | 5.0 | 0 | 2.5 | 5.0 |
| DSTDP/phosphite B | .25/10 | | | | 3 | 5 | |
| DSTDP/H'P'/phosphite B | .25/.07/.10 | | | | 19 | 43 | |
| DSTDP/HP/phosphite B | .25/.07/.10 | | | | | 60 | |
| DSTDP/HP/phosphite B | .25/.07/.10 | | | | 78 | | |
| DSTDP/HP | .25/.05 | | 19 | | | 109 | |
| DSTDP/HP | .25/.10 | 7 | 33 | | 106 | 142 | 96 |
| DSTDP/HP | .25/.15 | | | | 124 | | |
| DSTDP/HP | .35/.10 | | 30 | | | 51 | |
| DSTDP/HP | .50/.10 | | | | 14 | 28 | |
| DSTDP/HP/phosphite B | .25/.07/.10 | 7 | 30 | | | | |
| DSTDP/HP | .25/.10 | | | | 14 | 81 | 65 |
| DSTDP/HP | .35/.10 | | | | 34 | 96 | |

NOTES
DATDP=A dialkyl thiodipropionate.
See Table III for other codes.

As can be seen from the data in the above Table IV, considerable improvement in oxidative stability can be obtained when the additive of the invention is used in combination with conventional antioxidant stabilizer systems, in the absence of UV stabilizers.

What is claimed is:

1. An oxidatively stabilized composition exhibiting outstanding resistance to oxidative degradation which comprises in combination:

(a) a major portion of a $C_2$ to $C_8$ thermoplastic or elastomeric polyolefin constituent having a greater tendency to oxidative degradation than said composition;

(b) at least one conventional antioxidant stabilizer system; and (c) sufficient $C_3$ to $C_{10}$ unsaturated carboxylic acid grafted $C_3$ to $C_8$ thermoplastic or elastomeric polyolefin additive to incorporate from about .05 to 1.0 weight percent of grafted component into said constituent polyolefin wherein said additive has been prepared by extruder grafting of a base polyolefin and said additive is degraded in molecular weight from said base polyolefin as evidenced by an increase of at least 25% in the MFR of said additive as compared to the MFR of said base polyolefin.

2. A composition according to claim 1 wherein said composition also contains at least one conventional ultraviolet stabilizer.

3. A composition according to claim 1 wherein said constituent polyolefin is elastomeric.

4. A composition according to claim 1 wherein said grafted acid is acrylic acid.

5. A composition according to claim 1 wherein said constituent polyolefin is polypropylene and said additive is acrylic acid grafted to polypropylene.

6. A composition according to claim 2 wherein said UV stabilizer is a nickel complex.

7. A composition according to claim 6 wherein said nickel complex is nickel stearate.

8. A composition according to claim 6 wherein said nickel complex stabilizer is supplemented by an additional UV stabilizer.

9. A composition according to claim 1 wherein said antioxidant stabilizer is a thioester.

10. A composition according to claim 1 wherein said antioxidant component is a conventional phenolic antioxidant and a conventional thioester antioxidant in combination.

11. A polypropylene composition of enhanced oxidation resistance comprising:
    (a) a nickel complex ultraviolet stabilizer;
    (b) a conventional phenolic and thioester antioxidant combination; and
    (c) an acrylic acid grafted polypropylene wherein the amount of acrylic acid graft in said polypropylene is from 0.02 to 20 weight percent and wherein the amount of acrylic acid graft in said total composition is from about .06 to .6 weight percent.

12. A composition according to claim 11 wherein said graft polymer has been prepared by extruder grafting.

References Cited
UNITED STATES PATENTS

| | | | |
|---|---|---|---|
| 3,226,454 | 12/1965 | Marans et al. | 260—876 R |
| 3,177,269 | 4/1965 | Nowak et al. | 260—876 R |
| 3,177,270 | 4/1965 | Jones et al. | 260—876 R |
| 3,211,808 | 10/1965 | Young | 260—876 R |
| 3,299,176 | 1/1967 | Longworth | 260—876 R |

MORTON FOELAK, Primary Examiner

U.S. Cl. X.R.

260—4 R, 45.7 P, 45.75 N, 45.8 N, 45.85 A, 45.85 S, 45.9 R, 45.95 F, 836, 878 R